(12) United States Patent
Deng et al.

(10) Patent No.: US 11,037,017 B2
(45) Date of Patent: Jun. 15, 2021

(54) METHOD AND DEVICE FOR OBTAINING IMAGE OF FORM SHEET

(71) Applicant: HANGZHOU HIKROBOT TECHNOLOGY CO., LTD, Hangzhou (CN)

(72) Inventors: Zhihui Deng, Hangzhou (CN); Zhigang Hu, Hangzhou (CN); Wencong Zhang, Hangzhou (CN); Chuanyan Wang, Hangzhou (CN); Yuwen Lv, Hangzhou (CN); Haiyan Wang, Hangzhou (CN)

(73) Assignee: HANGZHOU HIKROBOT TECHNOLOGY CO., LTD, Hangzhou (CN)

( * ) Notice: Subject to any disclaimer, the term of this patent is extended or adjusted under 35 U.S.C. 154(b) by 138 days.

(21) Appl. No.: 16/464,177

(22) PCT Filed: Aug. 10, 2017

(86) PCT No.: PCT/CN2017/096795
§ 371 (c)(1),
(2) Date: May 24, 2019

(87) PCT Pub. No.: WO2018/099132
PCT Pub. Date: Jun. 7, 2018

(65) Prior Publication Data
US 2020/0293811 A1 Sep. 17, 2020

(30) Foreign Application Priority Data
Nov. 30, 2016 (CN) .......................... 201611094195.6

(51) Int. Cl.
*G06K 9/46* (2006.01)
*G06K 9/00* (2006.01)
(Continued)

(52) U.S. Cl.
CPC ....... *G06K 9/4638* (2013.01); *G06K 9/00463* (2013.01); *G06K 9/18* (2013.01); *G06K 9/3216* (2013.01); *G06K 9/3241* (2013.01)

(58) Field of Classification Search
CPC .... G06K 9/46; G06K 9/00442; G06K 9/4638; G06K 9/00463
See application file for complete search history.

(56) References Cited

U.S. PATENT DOCUMENTS

| 5,867,595 | A | 2/1999 | Cymbalski |
| 6,728,391 | B1 * | 4/2004 | Wu ........................... B07C 1/00 209/583 |

(Continued)

FOREIGN PATENT DOCUMENTS

| CN | 104079730 | 10/2014 |
| CN | 104881770 | 9/2015 |

(Continued)

OTHER PUBLICATIONS

De Rijcke et al., "Issues in Developing a Commercial Parcel Reading System." *Proceedings of the 2005 Eight International Conference on Document Analysis and Recognition*, Aug. 31, 2005, 1015-1019.

(Continued)

*Primary Examiner* — John J Lee
(74) *Attorney, Agent, or Firm* — Norton Rose Fulbright US LLP

(57) ABSTRACT

The present application discloses a method and apparatus for obtaining an image of a form sheet, which belongs to the field of image processing technology. The method includes: obtaining graphic code information from an image to be processed, wherein the graphic code information comprises at least position information of a graphic code; determining form sheet image feature information in the image to be processed based on the position information of the graphic (Continued)

code; and obtaining an image of a form sheet from the image to be processed based on the form sheet image feature information. In the present application, there is no manual operation of obtaining the image of the form sheet is needed, and thus the resources are saved and the efficiency of obtaining the image of the form sheet is improved.

18 Claims, 4 Drawing Sheets

(51) Int. Cl.
    *G06K 9/18*         (2006.01)
    *G06K 9/32*         (2006.01)

(56) References Cited

U.S. PATENT DOCUMENTS 6,898,314 B2 * 5/2005 Kung ................... G06K 9/325
                                                                382/168
2012/0086963 A1   4/2012   Fujitsuka et al.
2015/0113061 A1 *  4/2015   Nakamura ............ H04W 76/10
                                                                     709/204
2018/0198937 A1 *  7/2018   Yoshizawa ......... G06K 9/00442

FOREIGN PATENT DOCUMENTS

| | | |
|---|---|---|
| CN | 104933387 | 9/2015 |
| JP | 2014-206836 | 10/2014 |
| WO | WO 01/46899 | 6/2001 |

OTHER PUBLICATIONS

Extended European Search Report issued in corresponding European application No. 17877073.1, dated Nov. 27, 2019.
International Search Report and Written Opinion issued Corresponding International Patent Application No. PCT/CN2017/096795, dated Oct. 24, 2017.

* cited by examiner

METHOD AND DEVICE FOR OBTAINING IMAGE OF FORM SHEET

CROSS-REFERENCE TO RELATED APPLICATIONS

The present application is a national phase under 35 U.S.C. § 371 of International Application No. PCT/CN2017/096795, filed Aug. 10, 2017, which claims priority to Chinese patent application No. 201611094195.6, filed with the China National Intellectual Property Administration on Nov. 30, 2016, entitled "Method and device for obtaining image of form sheet", each of which are incorporated into the present application by reference in their entirety.

The present application claims priority to a Chinese patent application No. 201611094195.6, filed with the China National Intellectual Property Administration on Nov. 30, 2016 and entitled "Method and device for obtaining image of form sheet", which is incorporated into the present application by reference in its entirety.

TECHNICAL FIELD

The present application relates to the field of image processing technology, and in particular, to a method and apparatus for obtaining an image of a form sheet.

BACKGROUND

With the development of economy and commerce, form sheets are used more and more widely, such as form sheets on express parcels and form sheets on goods. Such form sheet generally records information on the parcels or goods. Therefore, in order to obtain the information, there is an urgent need to develop a method for obtaining an image of a form sheet.

In the related art, a surveillance camera may be mounted to obtain a surveillance video of goods or a parcel. The surveillance video is then identified by a person to obtain an image of the form sheet of the goods or the parcel. However, the image from the surveillance video usually has a low image quality and the surveillance video may include a lot of irrelevant information, such as images not including any goods or parcels. As a result, it is inefficient to obtain the image of the form sheet in this way.

SUMMARY

Embodiments of the present application provide a method and apparatus for obtaining an image of a form sheet to improve efficiency of obtaining the image of the form sheet. The technical solutions are explained as follows.

In a first aspect, a method for obtaining an image of a form sheet is provided. The method includes:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

Combined with the first aspect, in first possible implementation of the first aspect, determining form sheet image feature information in the image to be processed based on the position information of the graphic code includes:

determining an area where the graphic code is located based on the position information of the graphic code;

determining an image within the area in the image to be processed as an image of the graphic code;

obtaining feature information of a reflection region of the image of the graphic code; and determining the obtained feature information as the form sheet image feature information in the image to be processed.

Combined with the first possible implementation of the first aspect, in second possible implementation of the first aspect, determining an area where the graphic code is located based on the position information of the graphic code includes:

determining a minimum bounding rectangle of the graphic code based on the position information of the graphic code; and determining an area within the minimum bounding rectangle of the graphic code as the area where the graphic code is located.

Combined with the second possible implementation of the first aspect, in third possible implementation of the first aspect, determining a minimum bounding rectangle of the graphic code based on the position information of the graphic code includes:

when the position information of the graphic code comprises a position of a center point and a dimension of the minimum bounding rectangle of the graphic code and the graphic code information further comprises an orientation of the graphic code, determining the minimum bounding rectangle of the graphic code based on the position of the center point and the dimension of the minimum bounding rectangle of the graphic code and the orientation of the graphic code; or when the position information of the graphic code comprises positions of four vertexes of the minimum bounding rectangle of the graphic code, determining the minimum bounding rectangle of the graphic code based on the positions of the four vertexes of the minimum bounding rectangle of the graphic code; or when the position information of the graphic code comprises an outline of the graphic code, determining the minimum bounding rectangle of the graphic code based on the outline of the graphic code.

Combined with the first possible implementation of the first aspect, in fourth possible implementation of the first aspect, obtaining feature information of a reflection region of the image of the graphic code includes:

obtaining feature information of the image of the graphic code;

determining the reflection region of the image of the graphic code based on the feature information of the image of the graphic code; and obtaining the feature information of the reflection region of the image of the graphic code from the image of the graphic code.

Combined with the first aspect, in fifth possible implementation of the first aspect, obtaining the image of the form sheet from the image to be processed based on the form sheet image feature information includes:

obtaining a binary image of the image to be processed based on the form sheet image feature information;

obtaining a connected domain of the image of the graphic code contained in the binary image;

determining a minimum bounding rectangle of the connected domain; and obtaining the image of the form sheet from the image to be processed based on position information of the minimum bounding rectangle of the connected domain.

Combined with the fifth possible implementation of the first aspect, in sixth possible implementation of the first aspect, obtaining the image of the form sheet from the image to be processed based on position information of the minimum bounding rectangle of the connected domain includes:

upon receiving an input dimension range of the form sheet, determining a dimension of the minimum bounding rectangle of the connected domain based on the position information of the minimum bounding rectangle of the connected domain;

determining whether the dimension of the minimum bounding rectangle of the connected domain is within the dimension range of the form sheet; and determining an image, in the image to be processed, located in the minimum bounding rectangle of the connected domain as the image of the form sheet, if the dimension of the minimum bounding rectangle of the connected domain is within the dimension range of the form sheet.

Combined with the first aspect, in seventh possible implementation of the first aspect, the graphic code information further comprises an orientation of the graphic code; and wherein after obtaining the image of the form sheet from the image to be processed based on the form sheet image feature information, the method further includes:

rotating the image of the form sheet to be upright based on the orientation of the graphic code.

Combined with the first aspect, in eighth possible implementation of the first aspect, before obtaining graphic code information from an image to be processed, the method further includes:

determining whether the image to be processed contains a graphic code; and obtaining the graphic code information from the image to be processed, if the image to be processed contains a graphic code.

In a second aspect, an apparatus for obtaining an image of a form sheet is provided. The apparatus includes:

a first obtaining module, configured for obtaining graphic code information from an image to be processed, wherein the graphic code information comprises at least position information of a graphic code;

a determining module, configured for determining form sheet image feature information in the image to be processed based on the position information of the graphic code; and a second obtaining module, configured for obtaining an image of a form sheet from the image to be processed based on the form sheet image feature information.

Combined with the second aspect, in first possible implementation in the second aspect, the determining module includes:

a first determining sub-module, configured for determining an area where the graphic code is located based on the position information of the graphic code;

a second determining sub-module, configured for determining an image within the area in the image to be processed as an image of the graphic code;

a first obtaining sub-module, configured for obtaining feature information of a reflection region of the image of the graphic code; and a third determining sub-module, configured for determining the obtained feature information as the form sheet image feature information in the image to be processed.

Combined with the first implementation of the second aspect, in second possible implementation of the second aspect, the first determining sub-module is specifically configured for:

determining a minimum bounding rectangle of the graphic code based on the position information of the graphic code; and determining an area within the minimum bounding rectangle of the graphic code as the area where the graphic code is located.

Combined with the second implementation of the second aspect, in third possible implementation of the second aspect, the first determining sub-module is specifically configured for:

when the position information of the graphic code comprises a position of a center point and a dimension of the minimum bounding rectangle of the graphic code and the graphic code information further comprises an orientation of the graphic code, determining a minimum bounding rectangle of the graphic code based on the position of the center point and the dimension of the minimum bounding rectangle of the graphic code and the orientation of the graphic code; or when the position information of the graphic code comprises positions of four vertexes of the minimum bounding rectangle of the graphic code, determining the minimum bounding rectangle of the graphic code based on the positions of the four vertexes of the minimum bounding rectangle of the graphic code; or when the position information of the graphic code comprises an outline of the graphic code, determining the minimum bounding rectangle of the graphic code based on the outline of the graphic code.

Combined with the first implementation of the second aspect, in fourth possible implementation of the second aspect, the first obtaining sub-module is specifically configured for:

obtaining feature information of the image of the graphic code;

determining the reflection region of the image of the graphic code based on the feature information of the image of the graphic code; and obtaining the feature information of the reflection region of the image of the graphic code from the image of the graphic code.

Combined with the second aspect, in fifth possible implementation in the second aspect, the second obtaining module includes:

a second obtaining sub-module, configured for obtaining a binary image of the image to be processed based on the form sheet image feature information;

a third obtaining sub-module, configured for obtaining a connected domain of the image of the graphic code contained in the binary image;

a fourth determining sub-module, configured for determining a minimum bounding rectangle of the connected domain; and a fourth obtaining sub-module, configured for obtaining the image of the form sheet from the image to be processed based on position information of the minimum bounding rectangle of the connected domain.

Combined with the fifth implementation of the second aspect, in sixth possible implementation of the second aspect, the fourth obtaining sub-module is further configured for:

upon receiving an input dimension range of the form sheet, determining a dimension of the minimum bounding rectangle of the connected domain based on the position information of the minimum bounding rectangle of the connected domain;

determining whether the dimension of the minimum bounding rectangle of the connected domain is within the dimension range of the form sheet; and determining an image, in the image to be processed, located in the minimum bounding rectangle of the connected domain as the image of the form sheet, if the dimension of the minimum bounding rectangle of the connected domain is within the dimension range of the form sheet.

Combined with the second aspect, in seventh possible implementation of the second aspect, the graphic code information further comprises an orientation of the graphic code; and the apparatus further includes:

a rotating module, configured for rotating the image of the form sheet to be upright based on the orientation of the graphic code.

Combined with the second aspect, in eighth possible implementation of the second aspect, the apparatus further includes:

a judging module, configured for determining whether the image to be processed contains a graphic code; and a triggering module, configured for triggering the first obtaining module to obtain the graphic code information from the image to be processed, if the image to be processed contains a graphic code.

In a third aspect, an electronic device is provided, which includes a processor and a memory.

The memory is configured for storing an application program.

The processor is configured for executing the application program stored in the memory to implement the following steps:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

In a fourth aspect, an application program is provided, which, when being executed, implements the following steps:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

In a fifth aspect, a storage medium is provided. The storage medium is configured for storing an application program that, when being executed, implements the following steps:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

The technical solutions provided by the embodiments of the present application have the following beneficial effects. In the embodiments of the present application, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved.

BRIEF DESCRIPTION OF THE DRAWINGS

In order to more clearly describe the technical solutions of the embodiments of the present application, accompanying drawings used in the description of the embodiments will be briefly described below. Obviously, the accompanying drawings described below are merely drawings for some embodiments of the present application. Those skilled in the art can also obtain other drawings based on these accompanying drawings without creative efforts.

DETAILED DESCRIPTION

In order for a more clear understanding of the objects, technical solutions and advantages of the present application, implementations of the present application will be described in detail below with reference to the accompanying drawings.

Figure 1:
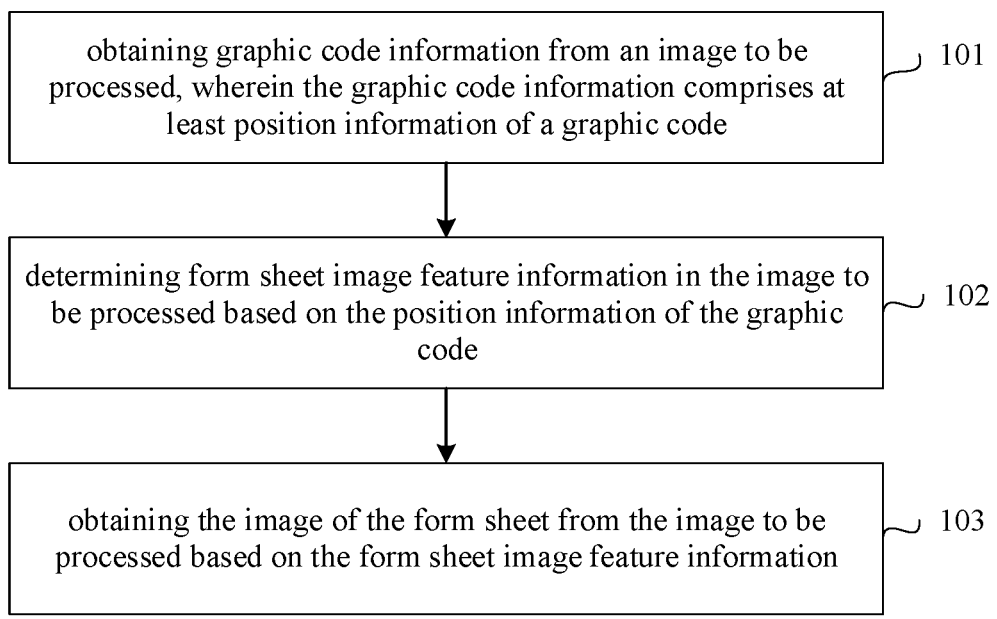
FIG. 1 illustrates a flowchart of a method for obtaining an image of a form sheet according to an embodiment of the present application.

FIG. 1 illustrates a flowchart of a method for obtaining an image of a form sheet according to an embodiment of the present application. Referring to FIG. 1, the method includes the steps 101-103.

At step 101, graphic code information is obtained from an image to be processed. The graphic code information includes at least position information of the graphic code.

At step 102, form sheet image feature information in the image to be processed is determined based on the position information of the graphic code.

At step 103, the image of the form sheet in the image to be processed is obtained based on the form sheet image feature information.

In the embodiment of the present application, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved.

Optionally, the determination of the form sheet image feature information in the image to be processed based on the position information of the graphic code includes:

determining an area where the graphic code is located based on the position information of the graphic code;

determining an image within the area in the image to be processed as an image of the graphic code;

obtaining feature information of a reflection region of the image of the graphic code; and determining the obtained feature information as the form sheet image feature information in the image to be processed.

Optionally, the determination of the area where the graphic code is located based on the position information of the graphic code includes:

determining a minimum bounding rectangle of the graphic code based on the position information of the graphic code; and determining an area within the minimum bounding rectangle of the graphic code as the area where the graphic code is located.

Optionally, the determination of the minimum bounding rectangle of the graphic code based on the position information of the graphic code includes:

when the position information of the graphic code comprises a position of a center point and a dimension of the minimum bounding rectangle of the graphic code and the graphic code information further comprises an orientation of the graphic code, determining the minimum bounding rectangle of the graphic code based on the position of the center point and the dimension of the minimum bounding rectangle of the graphic code and the orientation of the graphic code; or when the position information of the graphic code comprises positions of four vertexes of the minimum bounding rectangle of the graphic code, determining the minimum bounding rectangle of the graphic code based on the positions of the four vertexes of the minimum bounding rectangle of the graphic code; or when the position information of the graphic code comprises an outline of the graphic code, determining the minimum bounding rectangle of the graphic code based on the outline of the graphic code.

Optionally, the obtainment of the feature information of a reflection region of the image of the graphic code includes:

obtaining feature information of the image of the graphic code;

determining the reflection region of the image of the graphic code based on the feature information of the image of the graphic code; and obtaining the feature information of the reflection region of the image of the graphic code from the image of the graphic code.

Optionally, the obtainment of the image of the form sheet from the image to be processed based on the form sheet image feature information includes:

obtaining a binary image of the image to be processed based on the form sheet image feature information;

obtaining a connected domain of the image of the graphic code contained in the binary image;

determining a minimum bounding rectangle of the connected domain; and obtaining the image of the form sheet from the image to be processed based on position information of the minimum bounding rectangle of the connected domain.

Optionally, the obtainment of the image of the form sheet from the image to be processed based on position information of the minimum bounding rectangle of the connected domain includes:

upon receiving an input dimension range of the form sheet, determining a dimension of the minimum bounding rectangle of the connected domain based on the position information of the minimum bounding rectangle of the connected domain;

determining whether the dimension of the minimum bounding rectangle of the connected domain is within the dimension range of the form sheet; and determining an image, in the image to be processed, located in the minimum bounding rectangle of the connected domain as the image of the form sheet, if the dimension of the minimum bounding rectangle of the connected domain is within the dimension range of the form sheet.

Optionally, the graphic code information further includes an orientation of the graphic code.

After obtaining the image of the form sheet from the image to be processed based on the form sheet image feature information, the method further includes:

rotating the image of the form sheet to be upright based on the orientation of the graphic code.

Optionally, before obtaining the graphic code information from an image to be processed, the method further includes:

determining whether the image to be processed contains a graphic code; and obtaining the graphic code information from the image to be processed, if the image to be processed contains a graphic code.

Any of the above optional technical solutions can be combined in many ways to form other optional embodiments of the present application, which will not be described in detail herein.

Figure 2A:
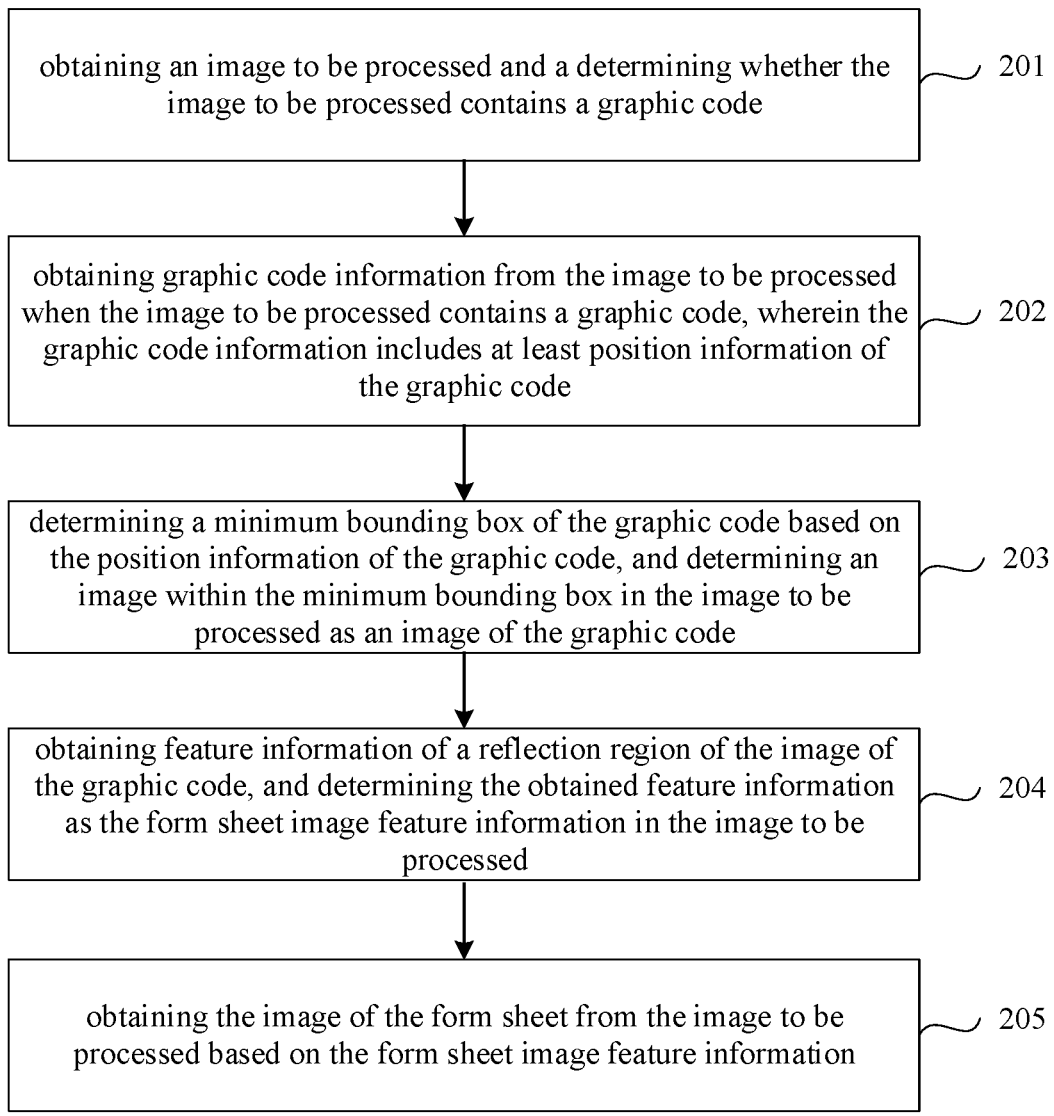
FIG. 2A illustrates a flowchart of another method for obtaining an image of a form sheet according to an embodiment of the present application.

FIG. 2A is a flowchart of a method for obtaining an image of a form sheet provided by an embodiment of the present application. Referring to FIG. 2A, the method includes the following steps.

At step 201, an image to be processed is obtained and a determination of whether the image to be processed contains a graphic code is performed.

A form sheet is usually provided on the external surface of goods or a parcel, and includes form sheet information related to the goods or parcel. For example, a form sheet on an express package may include form sheet information such as a recipient, a sender, and the address of the recipient. A form sheet on goods may include form sheet information such as use illustrations and an ingredient formula. In order to directly and briefly provide certain information related to the goods or the parcel, the form sheet usually further includes a graphic code such as a bar code or a quick response code. In practice, due to a shooting angle and a shooting position or other reasons when an image of the parcel or goods is shot, the image may not include a form sheet. Therefore, before obtaining form sheet information, an image including the goods or parcel may be first obtained as an image to be processed. The determination of whether the image to be processed contains a graphic code is performed to determine whether the image to be processed contains a form sheet.

The image to be processed may be directly obtained by shoot. Alternatively, the image to be processed may also be obtained, for example, by receiving the image sent by other devices such as a smart phone, a camera, or by downloading the image from a server.

It should be noted that the graphic code generally includes a reflection region and an absorption region. When the graphic code is illuminated by light, the reflection region, such as white areas in a bar code, can reflect the light, and the absorption region, such as black areas in the bar code, can absorb the light. In addition, the graphic code may also be other graphic codes including a reflection region and an absorption region.

It should also be noted that, for different types of graphic codes, different approaches may be used to determine whether the image to be processed contains a graphic code. For example, when the graphic code is a two-dimensional code, it is possible to determine whether there is a finder pattern of the two-dimensional code in the image to be processed. If there is a finder pattern of the two-dimensional code in the image to be processed, it is determined that the image to be processed has a two-dimensional code. When the graphic code is a bar code, it is possible to determine whether there is a start and stop marker of the bar code in the image to be processed. If there is a start and stop marker of the bar code in the image to be processed, it is determined that the image to be processed contains a bar code.

Figure 2B:
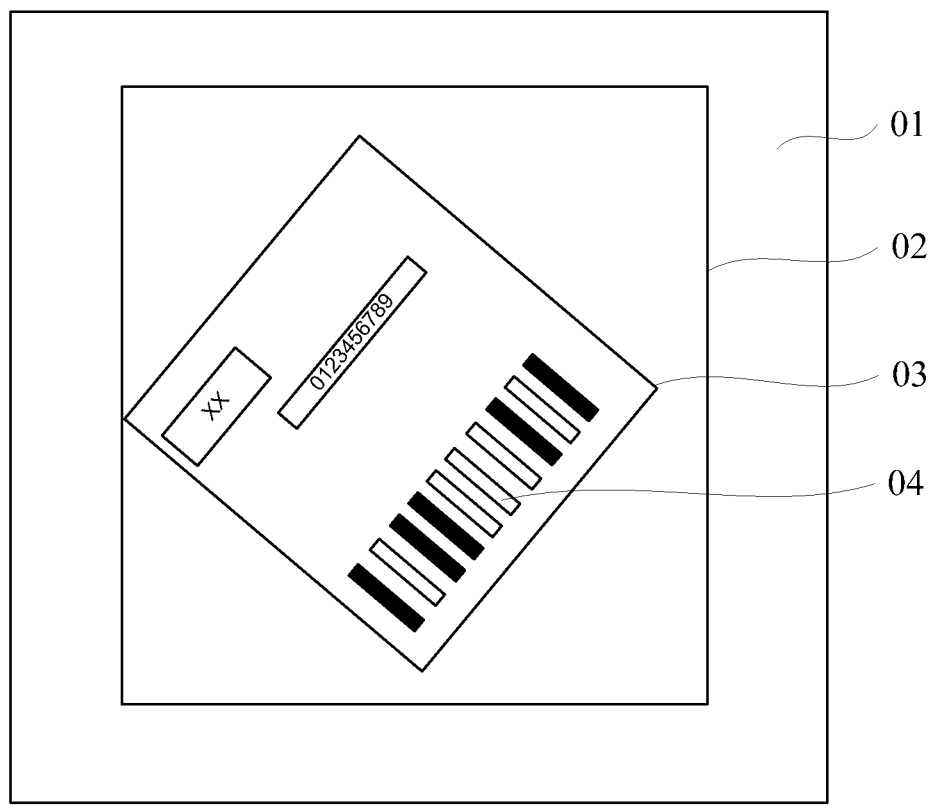
FIG. 2B illustrates a schematic diagram of an image to be processed according to an example of the present application.

For example, as shown in FIG. 2B, the image to be processed may include an image 01 of the environment where the goods or parcel is located, an image 02 of the goods or parcel, an image 03 of the form sheet, an image 04 of the graphic code, and the like.

In addition, the image to be processed generally contains an image of the form sheet. Therefore, in order to improve the efficiency of obtaining the image of the form sheet by the method for obtaining an image of a form sheet according to the embodiment, when the image to be processed is obtained at step 201, the step 202 of obtaining graphic code information from the image to be processed may be directly performed without determining whether the image to be processed contains a graphic code.

At step 202, when the image to be processed contains a graphic code, graphic code information is obtained from the image to be processed. The graphic code information includes at least position information of a graphic code.

Since the image to be processed contains a graphic code, namely, the image to be processed contains the image of a form sheet, the graphic code information may be obtained from the image to be processed.

The position information of the graphic code may include positions of four vertexes of a minimum bounding rectangle of the graphic code, the position of the center point of the graphic code, the dimension of the graphic code, the outline of the graphic code, and the like.

It should be noted that, the graphic code information may also include other information related to the graphic code, such as the orientation of the graphic code. The orientations of graphic codes of different types may be determined in different ways. For example, when the graphic code is a bar code, the direction perpendicular to the alignment of the reflection regions or absorption regions of the bar code may be determined as the direction of the bar code. When the graphic code is a two-dimensional code, the direction of the two-dimensional code may be determined based on the finder pattern of the two-dimensional code.

Additionally, when the image to be processed does not contain a graphic code, there may be no image of a form sheet contained in the image to be processed, and the step of obtaining graphic code information from the image to be processed may not be performed.

However, after the position information of the graphic code in the image to be processed is obtained at the above step, it may be determined that an image of a form sheet may be contained in the image to be processed. Therefore, in order to obtain the image of the form sheet, in a subsequent step, form sheet image feature information in the image to be processed may be determined based on the position information of the graphic code.

The form sheet image feature information is feature information of the image of the form sheet in the image to be processed. The form sheet image feature information may be feature information related to brightness of the background of the image of the form sheet, or may be other feature information related to the image of the form sheet. For example, the form sheet image feature information may also be feature information related to a color or texture feature of the image of the form sheet.

At step 203, an area where the graphic code is located is determined based on the position information of the graphic code, and an image within the area in the image to be processed is determined as an image of the graphic code.

It should be noted that, the area where the graphic code is located is a minimum bounding box of the graphic code.

Since the position information of the graphic code is information related to position of the graphic code in the image to be processed, the area where the graphic code is located may be determined based on the position information of the graphic code, and thus the image of the graphic code is determined.

A minimum bounding rectangle of the graphic code may be determined based on the position information of the graphic code, and an area within the minimum bounding rectangle of the graphic code is determined as the area where the graphic code is located.

In other possible implementation of the present application, the determination of the minimum bounding rectangle of the graphic code based on the position information of the graphic code may be: when the position information of the graphic code comprises a position of a center point and a dimension of the minimum bounding rectangle of the graphic code and the graphic code information further comprises an orientation of the graphic code, determining the minimum bounding rectangle of the graphic code based on the position of the center point and the dimension of the minimum bounding rectangle of the graphic code and the orientation of the graphic code. The determination may also be: when the position information of the graphic code comprises positions of four vertexes of the minimum bounding rectangle of the graphic code, determining the minimum bounding rectangle of the graphic code based on the positions of the four vertexes of the minimum bounding rectangle of the graphic code. Or, the determination may also be: when the position information of the graphic code comprises an outline of the graphic code, determining the minimum bounding rectangle of the graphic code based on the outline of the graphic code.

It should be noted that, the position of the center point of the minimum bounding rectangle of the graphic code may be coordinates of a pixel of the center point of the graphic code in the image to be processed. The positions of the four vertexes of the minimum bounding rectangle of the graphic code may be coordinates of pixels of the four vertexes of the graphic code in the image to be processed. The outline of the graphic code may be represented by an approximate polygon formed by a set of coordinates of pixels of the outline of the graphic code or a set of pixels of the outline.

At step 204, feature information of a reflection region of the image of the graphic code is obtained, and the obtained feature information is determined as the form sheet image feature information in the image to be processed.

Features of the image of the reflection region in the graphic code is generally the same as features of the image of the form sheet. For example, brightness of the reflection region may be the same as brightness of the background of the image of the form sheet, or a color or texture of the reflection region may be the same as a color or texture of the background of the image of the form sheet. Therefore, the feature information of the reflection region of the graphic code can be determined as the form sheet image feature information in the image to be processed.

For example, the color of the background of a form sheet of an express package and the color of a reflection region of a bar code on the form sheet are both white, and an absorption region of the bar code is black.

The operation of obtaining the feature information of the reflection region of the image of the graphic code may be: obtaining feature information of the image of the graphic code; determining the reflection region of the image of the graphic code based on the feature information of the image of the graphic code; and obtaining the feature information of the reflection region of the image of the graphic code from the image of the graphic code.

It should be noted that, when obtaining the feature information of the reflection region of the image of the graphic code, feature information of an absorption region included in the feature information of the image of the graphic code may be deleted. The remaining feature information in the feature information of the image of the graphic code, after the feature information of the absorption region included in the feature information of the image of the graphic code is deleted, is determined as the feature information of the reflection region of the image of the graphic code. Alternatively, the feature information of the reflection region of the image of the graphic code may also be directly obtained.

In other possible implementation of the present application, the feature information of the form sheet may be a gray histogram. Correspondingly, the operation of obtaining the feature information of the reflection region of the image of the graphic code may be: obtaining gray histogram of the image of the graphic code, determining the reflection region of the image of the graphic code based on the gray histogram of the image of the graphic code, and obtaining a gray histogram of the reflection region of the image of the graphic code. For example, the gray histogram of the reflection region of the image of the graphic code may be obtained by an OTSU algorithm or a method of histogram extreme value. In order to improve the accuracy of obtaining the feature information of the reflection region of the image of the graphic code, namely to improve the accuracy of determining the form sheet image feature information in the image to be processed and thus the image quality of the obtained image of the form sheet, after obtaining the grays histogram of the reflection region of the image of the graphic code, the obtained gray histogram of the reflection region of the image of the graphic code may be screened. That is, a specific part of gray histogram is selected from the obtained gray histogram, and the selected gray histogram is determined as the gray histogram of the reflection region of the image of the graphic code.

The specific part of the gray histogram may be 90% of the gray histogram feature at the center thereof.

In another possible implementation, the form sheet image feature information may be a range of grayscale value. Correspondingly, the operation of obtaining the feature information of the reflection region of the image of the graphic code may be: obtaining a grayscale range of the image of the graphic code, and determining a grayscale threshold of the reflection region of the image of the graphic code by thresholding.

In an embodiment of the present application, in addition to the above methods of obtaining the form sheet image feature information in the image to be processed, the form sheet image feature information in the image to be processed may be determined by other methods. For example, in another possible implementation, before the step 204, the image of the graphic code may be inverted, after that, the feature information of the absorption region of the image of the graphic code is obtained, and then the obtained feature information is determined as the form sheet image feature information in the image to be processed.

At step 205, the image of the form sheet is obtained from the image to be processed based on the form sheet image feature information.

The image to be processed is an image obtained by shooting a parcel or goods, in addition the form sheet, an image of other object or a background, such as an image of an express package, may be shown in the image to be processed. The image of the other object or background is usually quite different from the image of the form sheet. Therefore, the image of the form sheet may be separated from the image of the other object or the background in the image to be processed through the form sheet image feature information, to obtained the image of the form sheet from the image to be processed.

Where, a binary image of the image to be processed may be obtained based on the form sheet image feature information. A connected domain of the image of the graphic code contained in the binary image may be obtained. A minimum bounding rectangle of the connected domain may be determined. The image of the form sheet then may be obtained from the image to be processed based on position information of the minimum bounding rectangle of the connected domain.

The binary image of the image to be processed may be obtained based on the form sheet image feature information in the following two possible ways. In the first possible way, each pixel in the image to be processed is traversed to obtained feature information of the pixel; the feature information of the pixel is compared with the form sheet image feature information; and if the feature information of the pixel is similar to the form sheet image feature information, the pixel value of the pixel is set to 1, otherwise, the pixel value of the pixel is set to 0. In the second possible way, the area of the graphic code is selected as the region of seed points for region growing. In the region growing process, feature information of each neighboring pixel of the seed points is obtained, and the feature information of the pixel is compared with the form sheet image feature information. If the feature information of the pixel is similar to the form sheet image feature information, the pixel value of the pixel is set to 1 and the pixel is added to the region of the seed points. If the feature information of the pixel is not similar to the form sheet image feature information, the pixel value of the pixel is set to 0.

It should be noted that, a similarity between the feature information of the pixel and the form sheet image feature information may be used to determine whether the feature information of the pixel is similar to the form sheet image feature information. When the similarity between the feature information of the pixel and the form sheet image feature information reaches a preset value, the feature information of the pixel can be determined to be similar to the form sheet image feature information. The preset value may be set before determining the similarity between the feature information of the pixel and the form sheet image feature information.

It should also be noted that, since a graphic code is usually provided in a form sheet, the connected domain including the image of the graphic code is the connected domain including the image of the form sheet.

In possible implementation of the present application, in order to improve the accuracy of obtaining the minimum bounding rectangle of the connected domain and thus the accuracy of obtaining the image of the form sheet, before determining the minimum bounding rectangle of the connected domain, a binary image including the connected domain may undergo morphological processing, for example to eliminate a burr interference at the edge of the connected domain.

Figure 2C:
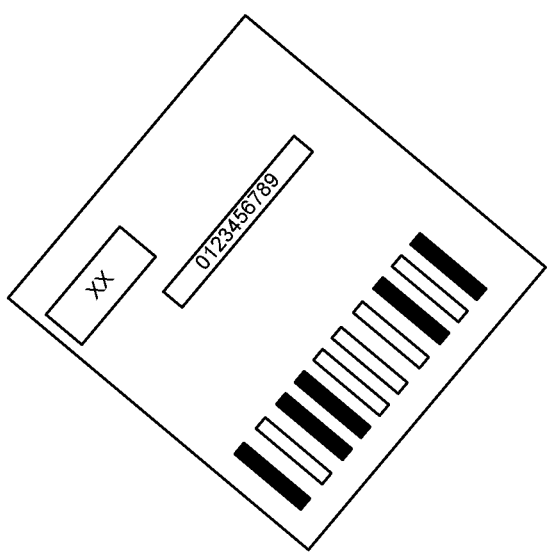
FIG. 2C illustrates a schematic diagram of an image of a form sheet according to an embodiment of the present application.

For example, the image of the form sheet obtained based on the form sheet image feature information from the image to be processed shown in FIG. 2B may be as shown in FIG. 2C.

It should be noted that, a range of form sheet dimensions input by a user may be received, to ensure that the minimum bounding rectangle of the connected domain conforms to the actual dimension of the form sheet in the image to be processed, and thereby to improve the accuracy of obtaining the image of the form sheet. When the input range of form sheet dimensions is received, the dimension of the minimum bounding rectangle of the connected domain may be determined based on the position information of the minimum bounding rectangle of the connected domain and it is determined whether the dimension of the minimum bounding rectangle of the connected domain is within the range of form sheet dimensions. If the dimension of the minimum bounding rectangle of the connected domain is within the range of form sheet dimensions, an image within the minimum bounding rectangle of the connected domain in the image to be processed is determined as the image of the form sheet.

The range of form sheet dimensions includes a maximum form sheet dimension and a minimum form sheet dimension. When the dimension of the minimum bounding rectangle of the connected domain is larger than the minimum form sheet dimension and smaller than the maximum form sheet dimension, the dimension of the minimum bounding rectangle of the connected domain is determined to be within the range of form sheet dimensions. When the dimension of the minimum bounding rectangle of the connected domain is smaller than the minimum form sheet dimension or larger than the maximum form sheet dimension, it is determined that the dimension of the minimum bounding rectangle of the connected domain is not within the range of form sheet dimensions.

It should be noted that, dimension input prompt information may be displayed before receiving the input range of form sheet dimensions, and the range of form sheet dimensions input by user is received based on the dimension input prompt information. The dimension input prompt information may be displayed in a window or a pop-up window, or may also be displayed in other manners.

In possible implementation of the present application, when the dimension of the minimum bounding rectangle of the connected domain is not within the range of form sheet dimensions, the step of determining the image within the minimum bounding rectangle of the connected domain in the image to be processed as the image of the form sheet may not be performed, and the method will return to any of the above steps.

Further, when no input range of form sheet dimensions is received, the step of determining an image within the minimum bounding rectangle of the connected domain in the image to be processed as the image of the form sheet may be directly performed.

Figure 2D:
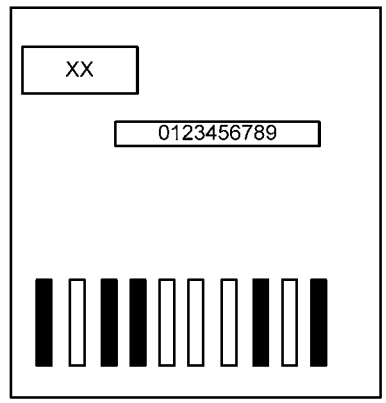
FIG. 2D illustrates a schematic diagram of another image of a form sheet according to an embodiment of the present application.

In possible implementation of the present application, the orientation of a graphic code in a form sheet is usually consistent with the orientation of the form sheet. Therefore, in order to improve image quality of the obtained image of the form sheet, the image of the form sheet may be rotated to be upright based on the orientation of the graphic code. For example, as shown in FIG. 2C, the angle between the orientation of the graphic code in the image of the form sheet and the horizontal direction is 45 degrees. Therefore, the image of the form sheet is rotated by −45 degrees to obtain the rotated image of the form sheet that is upright, as shown in FIG. 2D. After the image of the form sheet is obtained by above steps, the image of the form sheet may be further processed depending on different needs. For example, the image of the form sheet may be displayed to present the image of the form sheet to a user; the image of the form sheet may be stored to save the image of the form sheet; a quality evaluation and image enhancement may be performed on the image of the form sheet to improve the image quality of the image of the form sheet; a text recognition and defect detection may be performed on the image of the form sheet to obtain form sheet information in the image of the form sheet. Other processes may also be performed on the image of the form sheet.

It should be noted that, the quality of the image of the form sheet may be evaluated by determining whether the image of the form sheet is clear. Other quality evaluation processes may be performed on the image of the form sheet. For example, determining whether it is necessary to enhance the brightness of the image of the form sheet by determining an average brightness of the image of the form sheet; or determining whether it is necessary to enhance a sharpness of the image of the form sheet by determining an image edge strength of the image of the form sheet. Moreover, when multiple quality evaluation methods are possible, at least one of the multiple quality evaluation methods may be selected to evaluate the quality of the image of the form sheet.

The operation of determining whether the image of the form sheet is clear may include: obtaining gradient information of the image of the form sheet based on an image gradient operator, determining gradient magnitudes of the image of the form sheet based on the gradient information, determining a mean value or median value of the gradient magnitudes of the image of the form sheet as a clearness score of the image of the form sheet, determining whether the clearness score is larger than a clearness score threshold, and determining the image of the form sheet is clear if the clearness score is larger than the clearness score threshold, and determining the image of the form sheet is unclear when the clearness score is smaller than or equal to the clearness score threshold.

It should be noted that, the image gradient operator may be an operator such as sobel, laplace, robert, robinson, kirsch, frei, DoG, gabor filter or high-pass filter. The image gradient operator may also be other gradient operators.

It should also be noted that, the clearness score threshold may be determined before determining whether the clearness score is greater than the clearness score threshold. For example, in possible implementation, the clearness score threshold may be a value received from a user.

In possible implementation of the present application, when it is determined that the image of the form sheet is unclear, a contrast of the image of the form sheet may be increased to enhance the image of the form sheet.

The contrast of the image of the form sheet may be enhanced by histogram stretch or a curve mapping method. Further, the contrast of the image of the form sheet may be enhanced in other manners.

In addition, as can be seen from the above description, the quality of the image of the form sheet may be evaluated in other manners. Therefore, a corresponding image enhancement method may be selected based on the manner of evaluating the quality of the image of the form sheet. For example, when the quality of the image of the form sheet is evaluated by determining whether it is necessary to enhance the brightness of the image of the form sheet and it is determined that the brightness of the image of the form sheet needs to be enhanced, the gray value of the image of the form sheet may be adjusted to enhance the brightness of the image of the form sheet. When the quality of the image of the form sheet is evaluated by determining whether the sharpness of the image of the form sheet needs to be enhanced and it is determined that the sharpness of the image of the form sheet needs to be enhanced, the image of the form sheet may be sharpened.

In possible implementation of the present application, in order to improve efficiency of enhancing the image of the form sheet, the quality of the image of the form sheet may not be evaluated. Instead, image enhancement prompt information may be displayed to prompt the user to determine at least one image enhancement manner. When a determination instruction is received based on the image enhancement prompt information, the image of the form sheet is enhanced based on the image enhancement manner determined by the determination instruction.

The image enhancement prompt information may be displayed in a window or a pop-up window. The image enhancement prompt information may also be displayed in other manners.

It should be noted that, the determination instruction may be trigged by the user performing a preset operation. The preset operation may be such as a click operation, a touch operation, a sliding operation, or a key operation. The preset operation may also be other operation.

In possible implementation of the present application, a defect detection may be performed on the image of the form sheet by OCV (Optical Character Verification) to determine whether the text in the image of the form sheet is printed completely.

The operation of performing the defect detection on the image of the form sheet may include: obtaining a binary image of the image of the form sheet; performing morphological processing and connected domain analysis on the binary image of the image of the form sheet; determining an image of a character area of the image of the form sheet from the binary image of the image of the form sheet through a preset character feature; determining a similarity between the image of the character area of the image of the form sheet and an image of a character model; and if the similarity between the image of the character area of the image of the form sheet and the image of the character model is smaller than a preset character image similarity, determining that there is a defect in the image of the form sheet, otherwise, determining that there is no defect in the image of the form sheet.

It should be noted that, the binary image of the image of the form sheet may be obtained by a character thresholding method, such as line scanning thresholding. Further, the binary image of the image of the form sheet may also be obtained in other manners.

It should be noted that, the preset character feature may be determined before determining the image of the character area of the image of the form sheet from the binary image of the image of the form sheet. For example, in possible implementation, the preset character feature may be pre-set by relevant technicians.

It should also be noted that, the image of the character model may be determined before determining the similarity between the image of the character area of the image of the form sheet and an image of a character model. For example, in possible implementation, when an input image sample that is printed completely and includes texts is received, the image sample is determined as a training image; an image of a character area of the training image is determined; and the image of the character area is determined as the image of the character model. Further, the image of the character model may also be determined from the training image in other manners.

In possible implementation of the present application, a text recognition may be performed on the image of the form sheet by OCR (Optical Character Recognition), and thereby form sheet information of the image of the form sheet is obtained.

The image of the character area of the image of the form sheet may be obtained. A character feature is extracted from the image of the character area. Characters may be recognized based on the extracted character feature.

It should be noted that, the characters may be recognized based on the extracted character feature through a neural network or a SVM (Support Vector Machine).

In the embodiments of the present application, firstly, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved. Secondly, since the form sheet image feature information is usually the same as the feature information of the reflection region of the graphic code on the form sheet, the image of the graphic code may be determined based on the information of the graphic code, and the feature information of the reflection region in the image of the graphic code is obtained. Based on the obtained feature information, the image of the form sheet is obtained from the image to be processed, and the accuracy of obtaining the image of the form sheet is improved.

Figure 3:
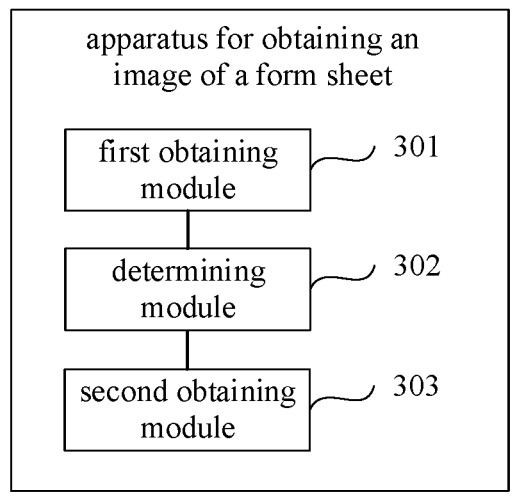
FIG. 3 illustrates a block diagram of an apparatus for obtaining an image of a form sheet according to an embodiment of the present application.

FIG. 3 is a block diagram of an apparatus for obtaining an image of a form sheet provided by an embodiment of the present application. Referring to FIG. 3, the apparatus includes: a first obtaining module 301, a determining module 302, and a second obtaining module 303.

The first obtaining module 301 is configured for: obtaining graphic code information from an image to be processed, wherein the graphic code information comprises at least position information of a graphic code.

The determining module 302 is configured for determining form sheet image feature information in the image to be processed based on the position information of the graphic code.

The second obtaining module 303 is configured for obtaining the image of the form sheet from the image to be processed based on the form sheet image feature information.

Optionally, the determining module 302 includes:
a first determining sub-module (not shown in FIG. 3), configured for determining an area where the graphic code is located based on the position information of the graphic code;
a second determining sub-module (not shown in FIG. 3), configured for determining an image within the area in the image to be processed as an image of the graphic code;
a first obtaining sub-module (not shown in FIG. 3), configured for obtaining feature information of a reflection region of the image of the graphic code; and
a third determining sub-module (not shown in FIG. 3), configured for determining the obtained feature information as the form sheet image feature information in the image to be processed.

Optionally, the first determining sub-module is specifically configured for:
determining a minimum bounding rectangle of the graphic code based on the position information of the graphic code; and
determining an area within the minimum bounding rectangle of the graphic code as the area where the graphic code is located.

Optionally, the first determining sub-module is specifically configured for:
when the position information of the graphic code comprises a position of a center point and a dimension of the minimum bounding rectangle of the graphic code and the graphic code information further comprises an orientation of the graphic code, determining a minimum bounding rectangle of the graphic code based on the position of the center point and the dimension of the minimum bounding rectangle of the graphic code and the orientation of the graphic code; or
when the position information of the graphic code comprises positions of four vertexes of the minimum bounding rectangle of the graphic code, determining the minimum bounding rectangle of the graphic code based on the positions of the four vertexes of the minimum bounding rectangle of the graphic code; or
when the position information of the graphic code comprises an outline of the graphic code, determining the minimum bounding rectangle of the graphic code based on the outline of the graphic code.

Optionally, the first obtaining sub-module is specifically configured for:
obtaining feature information of the image of the graphic code;
determining the reflection region of the image of the graphic code based on the feature information of the image of the graphic code; and
obtaining the feature information of the reflection region of the image of the graphic code from the image of the graphic code.

Optionally, the second obtaining module 303 includes:
a second obtaining sub-module (not shown in FIG. 3), configured for obtaining a binary image of the image to be processed based on the form sheet image feature information;
a third obtaining sub-module (not shown in FIG. 3), configured for obtaining a connected domain of the image of the graphic code contained in the binary image;
a fourth determining sub-module (not shown in FIG. 3), configured for determining a minimum bounding rectangle of the connected domain; and
a fourth obtaining sub-module (not shown in FIG. 3), configured for obtaining the image of the form sheet from the image to be processed based on position information of the minimum bounding rectangle of the connected domain.

Optionally, the fourth obtaining sub-module is specifically configured for:
upon receiving an input dimension range of the form sheet, determining a dimension of the minimum bounding rectangle of the connected domain based on the position information of the minimum bounding rectangle of the connected domain;
determining whether the dimension of the minimum bounding rectangle of the connected domain is within the dimension range of the form sheet; and
determining an image, in the image to be processed, located in the minimum bounding rectangle of the connected domain as the image of the form sheet, if the dimension of the minimum bounding rectangle of the connected domain is within the dimension range of the form sheet.

Optionally, the apparatus further includes:
a rotating module (not shown in FIG. 3), configured for rotating the image of the form sheet to be upright based on the orientation of the graphic code.

Optionally, the apparatus further includes:
a judging module (not shown in FIG. 3), configured for determining whether the image to be processed contains a graphic code; and
a triggering module (not shown in FIG. 3), configured for triggering the first obtaining module to obtain the graphic code information from the image to be processed, if the image to be processed contains a graphic code.

In the embodiments of the present application, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved.

Figure 4:
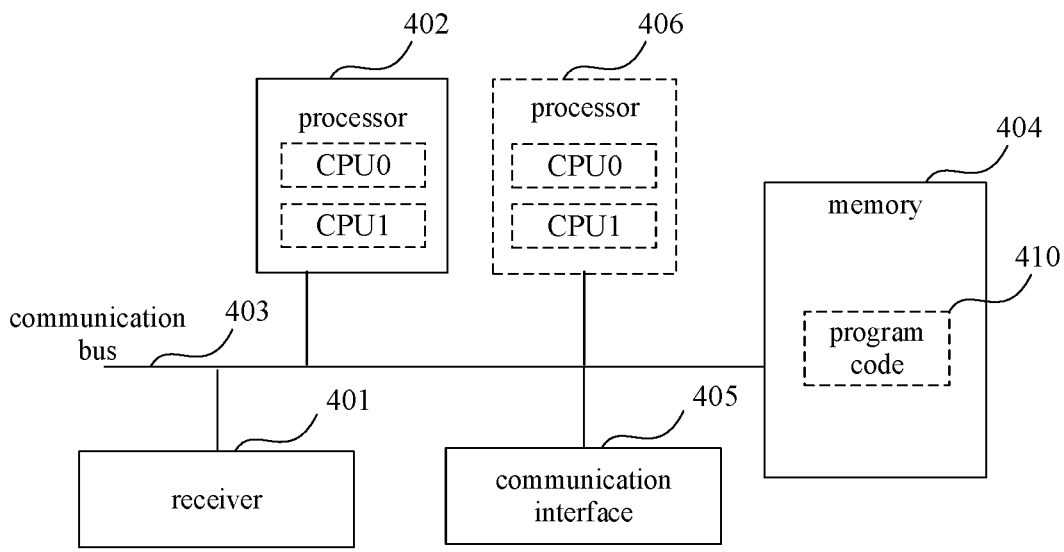
FIG. 4 illustrates a block diagram of another apparatus for obtaining an image of a form sheet according to an embodiment of the present application.

FIG. 4 is diagram illustrating the architecture of an apparatus for obtaining an image of a form sheet shown according to an exemplary embodiment. Referring to FIG. 4, the apparatus includes a receiver 401, at least one processor 402, a communication bus 403, a memory 404, and at least one communication interface 405.

The receiver 401 may obtain an image and receive other information related to the processing of the image.

The processor 402 may be a universal CPU, a microprocessor, an ASIC (Application-Specific Integrated Circuit), or one or more integrated circuit for controlling execution of the program in solutions of the present application.

The communication bus 403 may include a channel for communicating information among the assemblies described above.

The memory 404 may be, but not limited to: a ROM (Read-Only Memory), a RAM (Random Access Memory), other types of static storage device that may store static information and instructions, other types of dynamic storage device that may store information and instructions, or may be an EEPROM (Electrically Erasable Programmable Read-Only Memory), a CD-ROM (Compact Disc Read-Only Memory), or other optical disk storage, optical disc storage (including compact discs, laser discs, optical discs, digital versatile discs, Blu-ray discs, etc.), disk storage medium, or other magnetic storage device, or any other medium that can be configured for carrying or storing desired program code in the form of instructions or data structures and that can be accessed by the apparatus.

In an embodiment, the at least one processor 402 or the memory 404 may be integrated with the receiver 401. Of course, the at least one processor 402 and the memory 404 may also exist independently.

The communication interface 405 uses any apparatus such as a transceiver for communicating with other device or communication network, such as Ethernet, RAN (Radio Access Network), WLAN (Wireless Local Area Networks) and the like.

In an embodiment, as an embodiment, the processor 402 may include one or more CPUs, such as CPU0 and CPU1 shown in FIG. 4.

In an embodiment, the apparatus may include a plurality of processors, such as the processor 402 and the processor 406 shown in FIG. 4. Each of these processors may be a single-CPU or a multi-CPU. A processor herein may refer to one or more devices, circuits, and/or processing cores for processing data.

The processor 402 and the processor 406 have the same functions.

The memory 404 is configured for storing program code 410 for implementing the solutions of the present application, and the processor 402 is configured for executing the program code 410 stored in the memory 404. The apparatus may be implemented by the processor 402 and the program code 410 in the memory 404.

The architecture of the apparatus for obtaining an image of a form sheet has been described above. Next, how the assemblies of the apparatus implement the method for obtaining an image of a form sheet will be described.

The receiver 401 is configured for obtaining an image to be processed and information required for processing the image to be processed.

The memory 404 is configured for storing the image to be processed, information required for the processor 402 processing the image to be processed, and a processing result of processing the image to be processed by the processor 402.

The processor 402 is configured for:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

Optionally, the processor 402 is specifically configured for:

determining an area where the graphic code is located based on the position information of the graphic code;

determining an image within the area in the image to be processed as an image of the graphic code;

obtaining feature information of a reflection region of the image of the graphic code; and determining the obtained feature information as the form sheet image feature information in the image to be processed.

Optionally, the processor 402 is specifically configured for:

determining a minimum bounding rectangle of the graphic code based on the position information of the graphic code; and determining an area within the minimum bounding rectangle of the graphic code as the area where the graphic code is located.

Optionally, the processor 402 is specifically configured for:

when the position information of the graphic code comprises a position of a center point and a dimension of the minimum bounding rectangle of the graphic code and the graphic code information further comprises an orientation of the graphic code, determining the minimum bounding rectangle of the graphic code based on the position of the center point and the dimension of the minimum bounding rectangle of the graphic code and the orientation of the graphic code; or when the position information of the graphic code comprises positions of four vertexes of the minimum bounding rectangle of the graphic code, determining the minimum bounding rectangle of the graphic code based on the positions of the four vertexes of the minimum bounding rectangle of the graphic code; or when the position information of the graphic code comprises an outline of the graphic code, determining the minimum bounding rectangle of the graphic code based on the outline of the graphic code.

Optionally, the processor 402 is specifically configured for:

obtaining feature information of the image of the graphic code;

determining the reflection region of the image of the graphic code based on the feature information of the image of the graphic code; and obtaining the feature information of the reflection region of the image of the graphic code from the image of the graphic code.

Optionally, the processor 402 is specifically configured for:

obtaining a binary image of the image to be processed based on the form sheet image feature information;

obtaining a connected domain of the image of the graphic code contained in the binary image;

determining a minimum bounding rectangle of the connected domain; and obtaining the image of the form sheet from the image to be processed based on position information of the minimum bounding rectangle of the connected domain.

Optionally, the processor 402 is specifically configured for:

upon receiving an input dimension range of the form sheet, determining a dimension of the minimum bounding rectangle of the connected domain based on the position information of the minimum bounding rectangle of the connected domain;

determining whether the dimension of the minimum bounding rectangle of the connected domain is within the dimension range of the form sheet; and determining an image, in the image to be processed, located in the minimum bounding rectangle of the connected domain as the image of the form sheet, if the dimension of the minimum bounding rectangle of the connected domain is within the dimension range of the form sheet.

Optionally, the processor 402 is further configured for:

rotating the image of the form sheet to be upright based on the orientation of the graphic code.

Optionally, the processor 402 is further configured for:

determining whether the image to be processed contains a graphic code; and obtaining the graphic code information from the image to be processed, if the image to be processed contains a graphic code.

In the embodiments of the present application, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved.

An electronic device is further provided by an embodiment of the present application, and the electronic device includes a processor and a memory.

The memory is configured for storing an application program.

The processor is configured for executing the application program stored in the memory to implement the following steps:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

In the embodiment of the present application, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved An application program is further provided by an embodiment of the present application. The application program, when being executed, implements the following steps:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

In the embodiment of the present application, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved.

A storage medium is further provided by an embodiment of the present application. The storage medium is configured for storing an application program that, when executed, implements the following steps:

obtaining graphic code information from an image to be processed, wherein the graphic code information comprises at least position information of a graphic code;

determining form sheet image feature information in the image to be processed based on the position information of the graphic code; and obtaining an image of a form sheet from the image to be processed based on the form sheet image feature information.

In the embodiment of the present application, a form sheet is usually provided with a graphic code. It is thus possible to obtain graphic code information of a graphic code for an image to be processed. Next, the form sheet image feature information is determined based on the graphic code information. The image of the form sheet is then obtained from the image to be processed based on the form sheet image feature information. That is, the image of the form sheet can be obtained from the image to be processed based on the graphic code provided in the image of the form sheet in the image to be processed. Since no manual operations to obtain the image of the form sheet is required, resources are saved and the efficiency of obtaining the image of the form sheet is improved.

All the embodiments above are described in correlated manner, identical or similar parts in the embodiments can refer to one another, and the parts emphasized in each embodiment are differences to other embodiments. In particular, embodiments of the apparatus, electronic device, application program, and storage medium for obtaining an image of a form sheet are briefly described, in view of their basic resemblance with the embodiments of the method for obtaining an image of a form sheet. The relevant parts may refer to the embodiments of the method for obtaining an image of a form sheet shown in FIGS. 2A, 2B, 2C, and 2D.

It will be understood by those skilled in the art that all or some of the steps in the embodiments described above may be implemented by hardware, or by a program to instruct the relevant hardware. The program may be stored in a computer-readable storage medium. The above-mentioned storage medium may be a read only memory, a magnetic disk, or an optical disk, or the like.

The embodiments described above are only preferable embodiments of the present application, and are not intended to limit the present application. Any modifications, alternatives, improvements, or the like within the spirit and principles of the present application shall be included within the scope of protection of the present application.

The invention claimed is:

1. A method for obtaining an image of a form sheet, comprising:
    obtaining graphic code information from an image to be processed, wherein the graphic code information comprises at least position information of a graphic code;
    determining form sheet image feature information in the image to be processed based on the position information of the graphic code; and
    obtaining the image of the form sheet from the image to be processed based on the form sheet image feature information;
    wherein determining form sheet image feature information in the image to be processed based on the position information of the graphic code comprises:
    determining an area where the graphic code is located based on the position information of the graphic code;
    determining an image within the area in the image to be processed as an image of the graphic code;
    obtaining feature information of a reflection region of the image of the graphic code; and
    determining the obtained feature information as the form sheet image feature information in the image to be processed.

2. The method of claim 1, wherein determining an area where the graphic code is located based on the position information of the graphic code comprises:
    determining a minimum bounding rectangle of the graphic code based on the position information of the graphic code; and
    determining an area within the minimum bounding rectangle of the graphic code as the area where the graphic code is located.

3. The method of claim 2, wherein determining a minimum bounding rectangle of the graphic code based on the position information of the graphic code comprises:
    when the position information of the graphic code comprises a position of a center point and a dimension of the minimum bounding rectangle of the graphic code and the graphic code information further comprises an orientation of the graphic code, determining the minimum bounding rectangle of the graphic code based on the position of the center point and the dimension of the minimum bounding rectangle of the graphic code and the orientation of the graphic code; or
    when the position information of the graphic code comprises positions of four vertexes of the minimum bounding rectangle of the graphic code, determining the minimum bounding rectangle of the graphic code based on the positions of the four vertexes of the minimum bounding rectangle of the graphic code; or
    when the position information of the graphic code comprises an outline of the graphic code, determining the minimum bounding rectangle of the graphic code based on the outline of the graphic code.

4. The method of claim 1, wherein obtaining feature information of a reflection region of the image of the graphic code comprises:
    obtaining feature information of the image of the graphic code;
    determining the reflection region of the image of the graphic code based on the feature information of the image of the graphic code; and
    obtaining the feature information of the reflection region of the image of the graphic code from the image of the graphic code.

5. The method of claim 1, wherein obtaining the image of the form sheet from the image to be processed based on the form sheet image feature information comprises:
    obtaining a binary image of the image to be processed based on the form sheet image feature information;
    obtaining a connected domain of the image of the graphic code contained in the binary image;
    determining a minimum bounding rectangle of the connected domain; and
    obtaining the image of the form sheet from the image to be processed based on position information of the minimum bounding rectangle of the connected domain.

6. The method of claim 5, wherein obtaining the image of the form sheet from the image to be processed based on position information of the minimum bounding rectangle of the connected domain comprises:
    upon receiving an input dimension range of the form sheet, determining a dimension of the minimum bounding rectangle of the connected domain based on the position information of the minimum bounding rectangle of the connected domain;
    determining whether the dimension of the minimum bounding rectangle of the connected domain is within the dimension range of the form sheet; and
    determining an image, in the image to be processed, located in the minimum bounding rectangle of the connected domain as the image of the form sheet, if the dimension of the minimum bounding rectangle of the connected domain is within the dimension range of the form sheet.

7. The method of claim 1, wherein the graphic code information further comprises an orientation of the graphic code; and
    wherein after obtaining the image of the form sheet from the image to be processed based on the form sheet image feature information, the method further comprises:
    rotating the image of the form sheet to be upright based on the orientation of the graphic code.

8. The method of claim 1, wherein before obtaining graphic code information from an image to be processed, the method further comprises:
    determining whether the image to be processed contains a graphic code; and obtaining the graphic code information from the image to be processed, if the image to be processed contains a graphic code.

9. An electronic device comprising a processor and a memory, wherein
the memory is configured for storing an application program; and
the processor is configured for executing the application program stored in the memory to implement the method for obtaining an image of a form sheet of claim 1.

10. A non-transitory storage medium for storing an application program that, when being executed, implements the method for obtaining an image of a form sheet of claim 1.

11. An apparatus for obtaining an image of a form sheet, comprising:
a first obtaining module, configured for obtaining graphic code information from an image to be processed, wherein the graphic code information comprises at least position information of a graphic code;
a determining module, configured for determining form sheet image feature information in the image to be processed based on the position information of the graphic code; and
a second obtaining module, configured for obtaining the image of the form sheet from the image to be processed based on the form sheet image feature information;
wherein the determining module comprises:
a first determining sub-module, configured for determining an area where the graphic code is located based on the position information of the graphic code;
a second determining sub-module, configured for determining an image within the area in the image to be processed as an image of the graphic code;
a first obtaining sub-module, configured for obtaining feature information of a reflection region of the image of the graphic code; and
a third determining sub-module, configured for determining the obtained feature information as the form sheet image feature information in the image to be processed.

12. The apparatus of claim 11, wherein the first determining sub-module is further configured for:
determining a minimum bounding rectangle of the graphic code based on the position information of the graphic code; and
determining an area within the minimum bounding rectangle of the graphic code as the area where the graphic code is located.

13. The apparatus of claim 12, wherein the first determining sub-module is further configured for:
when the position information of the graphic code comprises a position of a center point and a dimension of the minimum bounding rectangle of the graphic code and the graphic code information further comprises an orientation of the graphic code, determining a minimum bounding rectangle of the graphic code based on the position of the center point and the dimension of the minimum bounding rectangle of the graphic code and the orientation of the graphic code; or
when the position information of the graphic code comprises positions of four vertexes of the minimum bounding rectangle of the graphic code, determining the minimum bounding rectangle of the graphic code based on the positions of the four vertexes of the minimum bounding rectangle of the graphic code; or
when the position information of the graphic code comprises an outline of the graphic code, determining the minimum bounding rectangle of the graphic code based on the outline of the graphic code.

14. The apparatus of claim 11, wherein the first obtaining sub-module is further configured for:
obtaining feature information of the image of the graphic code;
determining the reflection region of the image of the graphic code based on the feature information of the image of the graphic code; and
obtaining the feature information of the reflection region of the image of the graphic code from the image of the graphic code.

15. The apparatus of claim 11, wherein the second obtaining module comprises:
a second obtaining sub-module, configured for obtaining a binary image of the image to be processed based on the form sheet image feature information;
a third obtaining sub-module, configured for obtaining a connected domain of the image of the graphic code contained in the binary image;
a fourth determining sub-module, configured for determining a minimum bounding rectangle of the connected domain; and
a fourth obtaining sub-module, configured for obtaining the image of the form sheet from the image to be processed based on position information of the minimum bounding rectangle of the connected domain.

16. The apparatus of claim 15, wherein the fourth obtaining sub-module is further configured for:
upon receiving an input dimension range of the form sheet, determining a dimension of the minimum bounding rectangle of the connected domain based on the position information of the minimum bounding rectangle of the connected domain;
determining whether the dimension of the minimum bounding rectangle of the connected domain is within the dimension range of the form sheet; and
determining an image, in the image to be processed, located in the minimum bounding rectangle of the connected domain as the image of the form sheet, if the dimension of the minimum bounding rectangle of the connected domain is within the dimension range of the form sheet.

17. The apparatus of claim 11, wherein the graphic code information further comprises an orientation of the graphic code; and the apparatus further comprises:
a rotating module, configured for rotating the image of the form sheet to be upright based on the orientation of the graphic code.

18. The apparatus of claim 11, further comprising:
a judging module, configured for determining whether the image to be processed contains a graphic code; and
a triggering module, configured for triggering the first obtaining module to obtain the graphic code information from the image to be processed, if the image to be processed contains a graphic code.

* * * * *